United States Patent
Tong

(10) Patent No.: US 10,855,513 B2
(45) Date of Patent: Dec. 1, 2020

(54) INFORMATION PUSHING METHOD, DEVICE AND COMPUTER READABLE STORAGE MEDIUM

(71) Applicant: TENCENT TECHNOLOGY (SHENZHEN) COMPANY LIMITED, Shenzhen (CN)

(72) Inventor: Lei Tong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 199 days.

(21) Appl. No.: 15/673,109

(22) Filed: Aug. 9, 2017

(65) Prior Publication Data
US 2017/0359212 A1    Dec. 14, 2017

Related U.S. Application Data

(63) Continuation of application No. PCT/CN2016/082272, filed on May 16, 2016.

(30) Foreign Application Priority Data

Jun. 17, 2015   (CN) .......................... 2015 1 0337703

(51) Int. Cl.
*H04L 29/08*    (2006.01)
*H04L 29/06*    (2006.01)

(52) U.S. Cl.
CPC .......... *H04L 29/08* (2013.01); *H04L 63/1483* (2013.01); *H04L 67/02* (2013.01); *H04L 63/0245* (2013.01); *H04L 63/0428* (2013.01)

(58) Field of Classification Search
CPC ..... H04L 63/14; H04L 29/08; H04L 63/1483; H04L 67/02; H04L 63/0428; H04L 63/0245; H04L 67/26
See application file for complete search history.

(56) References Cited

U.S. PATENT DOCUMENTS 6,941,285 B2 * 9/2005 Sarcanin ............... G06Q 20/02
                                                      235/379
9,210,189 B2 * 12/2015 Dong ..................... H04L 63/14
(Continued)

FOREIGN PATENT DOCUMENTS

CN        102647417 A    8/2012
CN        102882936 A    1/2013
(Continued)

OTHER PUBLICATIONS

Office Action with Translation Issued in Chinese Application No. 201510337703.8 dated Mar. 27, 2018, in 25 pages.
(Continued)

*Primary Examiner* — Jimmy H Tran
(74) *Attorney, Agent, or Firm* — Anova Law Group, PLLC

(57) ABSTRACT

Disclosed are systems and methods for information pushing. An An example method includes receiving scenario description information reported by a terminal, with the scenario description information including webpage information and/or operation instruction information. A usage scenario of the terminal based on the scenario description information is calculated. A response message corresponding to the usage scenario of the terminal is acquired, with the response message including notice information and/or security operation prompt information. The notice information includes shopping recommendation information, hot news information, and/or software recommendation information. The security operation includes forbidding executing payment without valid permission, and/or forbidding reading and writing a file without valid permission.

12 Claims, 9 Drawing Sheets

(56) References Cited

U.S. PATENT DOCUMENTS

| | | | |
|---|---|---|---|
| 9,215,239 B1* | 12/2015 | Wang | H04L 63/1408 |
| 9,256,736 B2* | 2/2016 | Tao | H04L 63/1441 |
| 9,292,688 B2* | 3/2016 | Avasarala | G06F 21/56 |
| 9,473,528 B2* | 10/2016 | Zuk | H04L 63/145 |
| 9,589,266 B2* | 3/2017 | Pourfallah | G06Q 20/36 |
| 9,690,938 B1* | 6/2017 | Saxe | G06F 21/563 |
| 9,817,969 B2* | 11/2017 | Lee | H04L 63/1425 |
| 9,940,459 B1* | 4/2018 | Saxe | G06F 16/116 |
| 9,965,757 B2* | 5/2018 | Bhinder | G06Q 20/3221 |
| 10,142,366 B2* | 11/2018 | Goutal | H04L 63/1483 |
| 10,187,419 B2* | 1/2019 | Lin | H04W 4/18 |
| 10,212,123 B2* | 2/2019 | Baughman | H04L 61/1511 |
| 10,212,179 B2* | 2/2019 | Jiang | G06F 16/9566 |
| 10,218,716 B2* | 2/2019 | Huang | G06F 21/562 |
| 2006/0253579 A1* | 11/2006 | Dixon | G06Q 30/02 709/225 |
| 2008/0201401 A1* | 8/2008 | Pugh | H04L 63/1441 709/201 |
| 2009/0187763 A1* | 7/2009 | Freericks | G06F 21/54 713/167 |
| 2010/0153316 A1* | 6/2010 | Duffield | G06F 21/552 706/12 |
| 2011/0276716 A1 | 11/2011 | Coulson et al. | |
| 2012/0089481 A1* | 4/2012 | Iozzia | G06F 21/606 705/26.41 |
| 2012/0158626 A1* | 6/2012 | Zhu | G06F 21/56 706/13 |
| 2012/0323786 A1* | 12/2012 | Kirsch | G06Q 20/0855 705/44 |
| 2013/0103944 A1* | 4/2013 | Adams | H04W 12/1208 713/168 |
| 2014/0181931 A1* | 6/2014 | Bokarius | G06F 21/41 726/6 |
| 2014/0366156 A1* | 12/2014 | Liu | G06F 21/60 726/27 |
| 2015/0012441 A1* | 1/2015 | Atsmon | G06Q 30/0225 705/44 |
| 2015/0558986 | 2/2015 | Zhao et al. | |
| 2015/0067853 A1* | 3/2015 | Amrutkar | H04L 63/14 726/23 |
| 2015/0128205 A1* | 5/2015 | Mahaffey | H04L 63/20 726/1 |
| 2015/0154537 A1 | 6/2015 | Cai et al. | |
| 2015/0170072 A1* | 6/2015 | Grant | H04L 67/02 705/7.36 |
| 2016/0048526 A1* | 2/2016 | Zhu | H04L 63/08 715/240 |
| 2016/0119299 A1* | 4/2016 | Amulothu | H04L 63/0485 380/255 |
| 2016/0142429 A1* | 5/2016 | Renteria | H04L 63/1416 726/23 |
| 2016/0253498 A1* | 9/2016 | Valencia | G06F 21/554 726/23 |
| 2016/0337378 A1* | 11/2016 | Wan | G06Q 20/12 |
| 2017/0161392 A1 | 6/2017 | Liu | |
| 2018/0047072 A1* | 2/2018 | Chow | G06Q 30/0282 |
| 2019/0068571 A1* | 2/2019 | Feng | H04W 12/06 |

FOREIGN PATENT DOCUMENTS

| | | |
|---|---|---|
| CN | 102930214 A | 2/2013 |
| CN | 103064863 A | 4/2013 |
| CN | 103139152 A | 6/2013 |
| CN | 104063457 A | 9/2014 |
| CN | 104361085 A | 2/2015 |

OTHER PUBLICATIONS

International Search Report with Translation dated Jun. 28, 2016 for International Application No. PCT/CN2016/082272.

* cited by examiner

INFORMATION PUSHING METHOD, DEVICE AND COMPUTER READABLE STORAGE MEDIUM

The present application is a continuation of International Patent Application No. PCT/CN2016/082272 filed on May 16, 2016, which claims priority to Chinese Patent Application No. 201510337703.8, titled "INFORMATION PROCESSING METHOD, DEVICE, TERMINAL AND SERVER", filed on Jun. 17, 2015 with the State Intellectual Property Office of People's Republic of China, both of which are incorporated herein by reference in their entireties.

FIELD

The present disclosure relates to the technical field of internet, and particularly to the technical field of information processing, and more particularly to an information processing method, an information processing device, a terminal and a server.

BACKGROUND

With development of the internet technology and the terminal technology, more and more users use terminals to perform various networking operations, including browsing a webpage, electric shopping and the like. Currently, an Internet service operator often pushes notice information or security operation prompt information to Internet users, a process of pushing the notice information or the security operation prompt information is crude, for example, the notice information is pushed to all registered users in an electric shopping website, or news information is pushed to all registered users in a news website. Since not all registered users are interested in the pushed information, the large amount of information causes harassment for non-target users, which results in low effectiveness of interaction between the service operator or a service provider and the users, and low intelligence of information processing.

SUMMARY

An information processing method, an information processing device, a terminal and a server are provided according to the embodiments of the present disclosure, in which a response message including notice information and/or security operation prompt information is pushed based on a usage scenario of the terminal, to improve intelligence of information processing and improve effectiveness of information interaction.

An information processing method is provided according to a first aspect of the embodiments of the present disclosure. The information processing method includes: receiving scenario description information reported by a terminal, where the scenario description information includes webpage information and/or operation instruction information; calculating a usage scenario of the terminal according to the scenario description information; acquiring a response message corresponding to the usage scenario of the terminal, where the response message includes notice information and/or security operation prompt information, and the response message is for promoting the terminal to output the notice information and/or execute a security operation based on the security operation prompt information; and returning the response message to the terminal to perform scenario response processing.

Another information processing method is provided according to a second aspect of the embodiments of the present disclosure. The information processing method includes: collecting scenario description information on a usage scenario of a terminal, where the scenario description information includes webpage information and/or operation instruction information; reporting the scenario description information to a server, where the server calculates the usage scenario of the terminal based on the scenario description information, and acquires and returns a response message corresponding to the usage scenario of the terminal, where the response message includes notice information and/or security operation prompt information, the response message is for promoting the terminal to output the notice information and/or execute a security operation based on the security operation prompt information; and performing scenario response processing based on the response message returned from the server.

An information processing device is provided according to a third aspect of the embodiments of the present disclosure. The information processing device includes: an information receiving unit configured to receive scenario description information reported by a terminal, where the scenario description information includes webpage information and/or operation instruction information; a scenario calculating unit configured to calculate a usage scenario of the terminal based on the scenario description information; a message acquiring unit configured to acquire a response message corresponding to the usage scenario of the terminal, where the response message includes notice information and/or security operation prompt information, and the response message is for promoting the terminal to output the notice information and/or execute a security operation based on the security operation prompt information; and a response processing unit configured to return the response message to the terminal to perform scenario response processing.

A server is provided according to a fourth aspect of the embodiments of the present disclosure. The server includes the information processing device according to the third aspect described above.

Another information processing device is provided according to a fifth aspect of the embodiments of the present disclosure. The information processing device includes: an information collecting unit configured to collect scenario description information on a usage scenario of a terminal, where the scenario description information includes webpage information and/or operation instruction information; a reporting unit configured to report the scenario description information to a server, where the server calculates the usage scenario of the terminal based on the scenario description information, and acquires and returns a response message corresponding to the usage scenario of the terminal, where the response message includes notice information and/or security operation prompt information, and the response message is for promoting the terminal to output the notice information and/or execute a security operation based on the security operation prompt information; and a response processing unit configured to perform scenario response processing based on the response message returned from the server.

A terminal is provided according to a sixth aspect of the embodiments of the present disclosure. The terminal includes the information processing device according to the fifth aspect described above.

A computer readable storage medium is provided according to a seventh aspect of the embodiments of the present disclosure. The computer readable storage medium stores computer readable program codes. The computer readable program codes run in an information processing device for performing the method according to the first aspect.

In the embodiments of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

BRIEF DESCRIPTION OF THE DRAWINGS

In order to more clearly illustrate the technical solution in the embodiments of the present disclosure the following are introduced. The drawings in the following description illustrate only some embodiments of the present disclosure. For those skilled in the art, other drawings can also be obtained according to the drawings.

DETAILED DESCRIPTION OF EMBODIMENTS

Hereinafter, the technical solution in the embodiments of the present disclosure will be described clearly and completely with reference to the drawings in the embodiments of the present disclosure. Apparently, the described embodiments are only a part rather than all of the embodiments of the present disclosure. All the other embodiments obtained by those skilled in the art based on the embodiments of the present disclosure without creative work will fall within the scope of protection of the present disclosure.

In the embodiments of the present disclosure, a terminal may be a Personal Computer (PC), a laptop computer, a mobile phone, a panel computer (PAD) or an intelligent wearable device or the like. The terminal may be installed with various applications, including but not limited to instant messaging applications, Social Networking Services (SNS) applications, game applications, security applications and the like.

Based on the above description, an information processing method according to an embodiment of the present disclosure is described in detail below with reference to FIG. 1 to FIG. 3.

Figure 1:
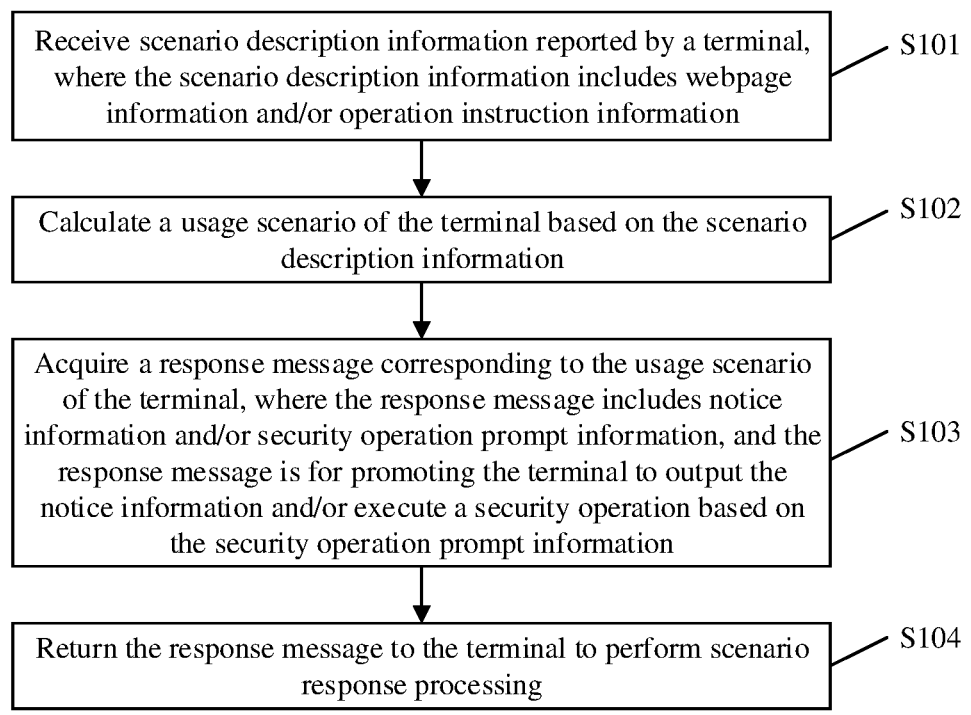
FIG. 1 is a flowchart of an information processing method according to an embodiment of the present disclosure.

With reference to FIG. 1, which is a flowchart of an information processing method according to an embodiment of the present disclosure, the flow of the information processing method is described at server side in the embodiment, and the information processing method includes steps S101 to S104 below.

In S101, scenario description information reported by the terminal is received. The scenario description information includes webpage information and/or operation instruction information.

The scenario description information may be used for describing a usage scenario of the terminal, the usage scenario of the terminal includes but is not limited to at least one of an electric shopping scenario, a legal webpage browsing scenario, an illegal webpage browsing scenario, a file read and write scenario. The electric shopping scenario may refer to a scenario in which a user browses an electric shopping website by the terminal or a user performs an item purchasing operation in the electric shopping website by the terminal. The legal webpage browsing scenario may refer to a scenario in which the user browses a legally registered webpage by the terminal, for example, the user browses a legally-registered news webpage by the terminal, or the user browses a legally-registered video webpage by the terminal. The illegal webpage browsing scenario may refer to a scenario in which the user browses a webpage that is not legally registered by the terminal, for example, the user browses a pornographic webpage by the terminal, or the user browses a violence or obscenity webpage by the terminal. The file read and write scenario may refer to a scenario in which the user performs a read and write operation on a file in the terminal, for example, the user performs an operation of copying or pasting on the file in the terminal. The webpage information includes but is not limited to at least one of webpage address information, webpage text information, webpage picture information, and webpage audio and video information. The webpage address information may be a Uniform Resource Locator (URL) of the webpage, such as an official URL of the electric shopping website. The operation instruction information includes but is not limited to at least one of an account registration operation instruction, a file read and write operation instruction and a payment operation instruction.

A wired or wireless communication connection may be established between the terminal and a server. The terminal may collect the scenario description information of the terminal based on various operation instructions initiated by a user for the terminal, and report the collected scenario description information to the server via the communication connection between the terminal and the server. Similarly, the server may receive the scenario description information reported by the terminal via the communication connection between the terminal and the server.

In S102, a usage scenario of the terminal is calculated based on the scenario description information.

Since the scenario description information is used for describing the usage scenario of the terminal, the usage scenario of the terminal includes but is not limited to at least one of an electric shopping scenario, a legal webpage browsing scenario, an illegal webpage browsing scenario, and a file read and write scenario. In step S102, the server may calculate and determine the usage scenario of the terminal based on the scenario description information.

In S103, a response message corresponding to the usage scenario of the terminal is acquired, the response message includes notice information and/or security operation prompt information, the response message is for promoting the terminal to output the notice information and/or execute a security operation based on the security operation prompt information.

The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. In the embodiment of the present disclosure, some information may be customized in advance at the server side for various usage scenarios. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario. In step S103, the server may acquire customized information corresponding to the usage scenario of the terminal, to generate the response message.

In S104, the response message is returned to the terminal to perform scenario response processing.

The server may send the response message corresponding to the usage scenario of the terminal to the terminal via the communication connection between the server and the terminal. The terminal may output the notice information included in the response message. For example, the terminal may output the notice information relating to shopping recommendation such as item price comparing information and item anti-counterfeiting information in the response message in a case that the usage scenario of the terminal is the electric shopping scenario. For another example, hot news information may be customized for the case that the usage scenario of the terminal is the legal webpage browsing scenario. The terminal may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, the terminal executes a security operation such as forbidding opening a webpage currently browsed by the user, or outputting a webpage risk prompt. For another example, if the response message includes security operation prompt information such as forbidding a file read operation or forbidding a file write operation in a case that the usage scenario of the terminal is the file read and write scenario, the terminal executes a security operation for forbidding the user to read or write the file. Since the response message corresponds to the usage scenario of the terminal, that is, the response message can provide the notice or the security prompt matching the usage scenario of the terminal, security and intelligence in use of the terminal and user experience are improved by the terminal performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 2:
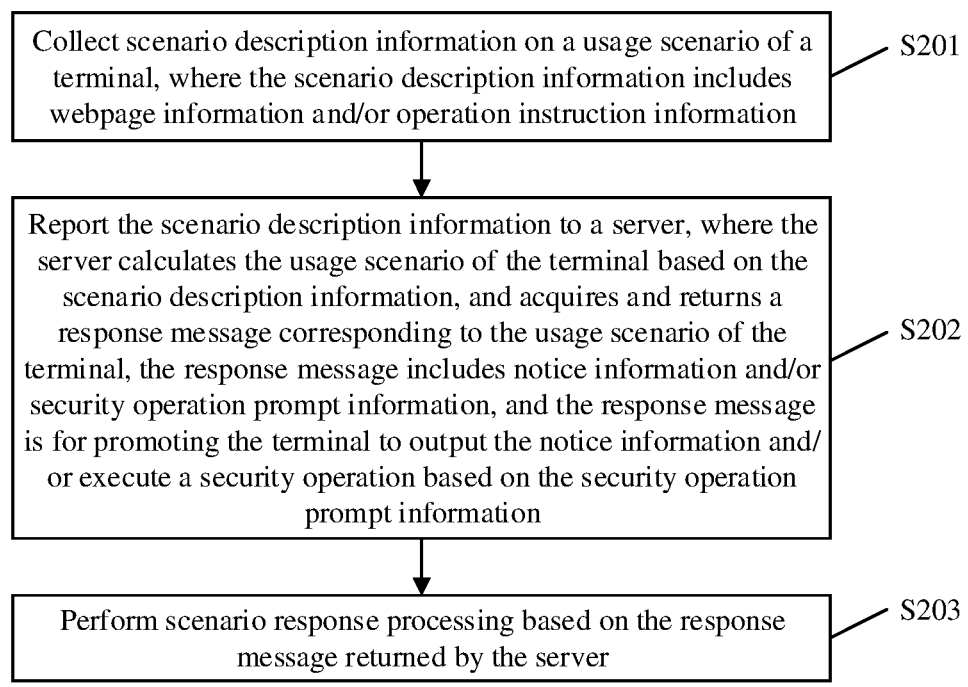
FIG. 2 is a flowchart of an information processing method according to an embodiment of the present disclosure.

With reference to FIG. 2, which is a flowchart of an information processing method according to an embodiment of the present disclosure, a flow of the information processing method is described at terminal side in the embodiment, and the information processing method includes steps S201 to S203 below.

In S201, scenario description information on a usage scenario of a terminal is collected. The scenario description information includes webpage information and/or operation instruction information.

The terminal collects the scenario description information of the terminal based on various operation instructions initiated by the user for the terminal. The scenario description information may describe a usage scenario of the terminal. The usage scenario of the terminal includes but is not limited to at least one of an electric shopping scenario, a legal webpage browsing scenario, an illegal webpage browsing scenario, a file read and write scenario. The electric shopping scenario may refer to a scenario in which a user browses an electric shopping website by the terminal or a user performs an item purchasing operation in the electric shopping website by the terminal. The legal webpage browsing scenario may refer to a scenario in which the user browses a legally registered webpage by the terminal, for example, the user browses a legally registered news webpage by the terminal, or the user browses a legally registered video webpage by the terminal. The illegal webpage browsing scenario may refer to a scenario in which the user browses a webpage that is not legally registered by the terminal, for example, the user browses a pornographic webpage by the terminal, or the user browses a violence obscenity webpage by the terminal. The file read and write scenario may refer to a scenario in which the user performs a read and write operation on a file in the terminal, for example, the user performs an operation of copying or pasting on the file in the terminal. The webpage information includes but is not limited to at least one of webpage address information, webpage text information, webpage picture information, and webpage audio and video information. The webpage address information may be a URL of the webpage, such as an official URL of the electric shopping website. The operation instruction information includes but is not limited to at least one of an account registration operation instruction, a file read and write operation instruction and a payment operation instruction.

In S202, the scenario description information is reported to a server, such that the server calculates a usage scenario of the terminal based on the scenario description information, and acquires and returns a response message corresponding to the usage scenario of the terminal. The response message includes notice information and/or security operation prompt information. The response message is for promoting the terminal to output the notice information and/or execute a security operation based on the security operation prompt information.

A wired or wireless communication connection may be established between the terminal and the server. The terminal may collect the scenario description information of the terminal based on various operation instructions initiated by a user for the terminal, and report the collected scenario description information to the server via the communication connection between the terminal and the server. The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. In the embodiment of the present disclosure, some information may be customized in advance at the server side for various usage scenarios. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario. The server may acquire customized information corresponding to the usage scenario of the terminal, to generate the response message, and return the response message to the terminal via the communication connection between the server and the terminal.

In S203, scenario response processing is performed based on the response message returned by the server.

The terminal may output the notice information included in the response message. For example, the notice information relating to shopping recommendation such as item price comparing information and item anti-counterfeiting information in the response message may be outputted in a case that the usage scenario of the terminal is the electric shopping scenario. For another example, hot news information may be customized for the case that the usage scenario of the terminal is the legal webpage browsing scenario. The terminal may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, the terminal executes a security operation such as forbidding opening a webpage currently browsed by the user, or outputting a webpage risk prompt. For another example, if the response message includes security operation prompt information such as forbidding a file read operation or forbidding a file write operation in a case that the usage scenario of the terminal is the file read and write scenario, the terminal executes a security operation for forbidding the user to read or write the file. Since the response message corresponds to the usage scenario of the terminal, that is, the response message can provide the notice or the security prompt matching the usage scenario of the terminal, security and intelligence in use of the terminal, and user experience are improved by the terminal performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by the terminal performing the scenario response processing based on the response message.

Figure 3:
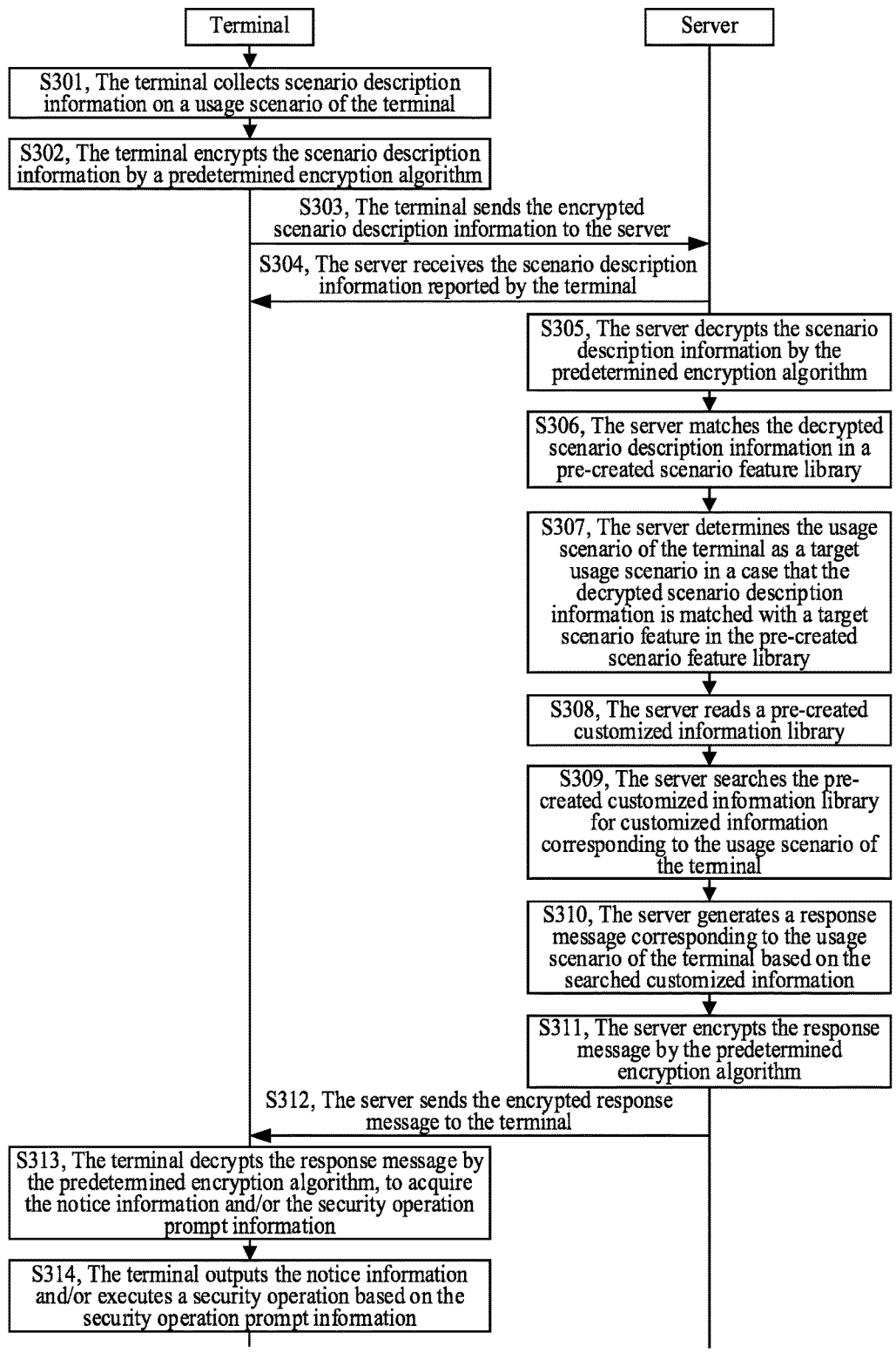
FIG. 3 is a flowchart of an information processing method according to an embodiment of the present disclosure.

With reference to FIG. 3, which is a flowchart of an information processing method according to an embodiment of the present disclosure, the flow of the information processing method is described with respect of interaction between a terminal and a server in the embodiment, and the information processing method includes steps S301 to S314.

In S301, the terminal collects scenario description information on a usage scenario of the terminal. The scenario description information includes webpage information and/or operation instruction information.

The terminal may collect the scenario description information of the terminal based on various operation instructions initiated by a user for the terminal. The scenario description information is used for describing a usage scenario of the terminal. The usage scenario of the terminal includes but is not limited to at least one of an electric shopping scenario, a legal webpage browsing scenario, an illegal webpage browsing scenario, a file read and write scenario. In practice, step S301 may include two feasible implementations.

In an implementation, the terminal monitors a plugin interface of a browser of the terminal, and in a case that it is monitored that the browser of the terminal accesses a webpage, acquires information on the accessed webpage.

The usage scenario of the terminal includes but is not limited to at least one of an electric shopping scenario, a legal webpage browsing scenario, an illegal webpage browsing scenario, a file read and write scenario. In the usage scenarios described above, the user usually uses various plugins in the browser of the terminal. In the embodiment, a plugin interface of the browser of the terminal is monitored, and information on an accessed webpage may be acquired with a HOOK technology in a case that it is monitored that the browser of the terminal performs electric shopping or webpage browsing. The information on the webpage includes but is not limited to at least one of webpage address information, webpage text information, webpage picture information, and webpage audio and video information. The webpage address information may be a URL of the webpage, such as an official URL of an electric shopping website.

In another implementation, the terminal monitors an API interface of a system of the terminal, and in a case that it is monitored that the system of the terminal responds to an operation instruction, acquires received operation instruction information.

The usage scenario of the terminal includes but is not limited to an account registration scenario, a file read and write scenario, a payment scenario and the like. In the usage scenarios described above, the system of the terminal is usually accessed. In the embodiment, an API interface of the system of the terminal is monitored, operation instruction information sent to the system of the terminal by the user is acquired in a case that it is monitored that the system of the terminal responds to an operation instruction. The operation instruction information includes but is not limited to at least one of an account registration operation instruction, a file read and write operation instruction and a payment operation instruction.

It should be noted that the two feasible implementations described above may be selected flexibly or combined.

In S302, the terminal encrypts the scenario description information by a predetermined encryption algorithm.

The predetermined encryption algorithm may be selected according to circumstances. The predetermined encryption algorithm includes but is not limited to a symmetric encryption algorithm, an asymmetric encryption algorithm, a Hash algorithm and the like. The purpose of the terminal encrypting the scenario description information by the predetermined encryption algorithm is to ensure reliability of transmission of the scenario description information and improve transmission security.

In S303, the terminal sends the encrypted scenario description information to the server.

A wired or wireless communication connection is established between the terminal and the server, and the terminal may send the encrypted scenario description information to the server via the communication connection between the terminal and the server.

Steps S302 and S303 in the embodiment may be detailed steps of step S202 in the embodiment shown in FIG. 2.

In S304, the server receives the scenario description information reported by the terminal. The scenario description information includes webpage information and/or operation instruction information. The server receives the scenario description information reported by the terminal via the communication connection between the server and the terminal.

In S305, the server decrypts the scenario description information by the predetermined encryption algorithm.

In step S305, the server decrypts the scenario description information by the same predetermined encryption algorithm which is negotiated with the terminal. By the encryption process of the terminal and the decryption process of the server for the scenario description information, transmission security and reliability of the scenario description information can be ensured effectively.

In S306, the server matches the decrypted scenario description information in a pre-created scenario feature library. The pre-created scenario feature library includes at least one usage scenario and a scenario feature of the usage scenario.

The pre-created scenario feature library may be created at the server side. The pre-created scenario feature library may be created according to experience or statistics. For example, the scenario feature of the electric shopping scenario may include an official URL provided by an electric business operator, and text, pictures and the like describing an item in the electric shopping website. For another example, a scenario feature of the illegal browsing scenario may include a URL that is not registered legally or an illegal URL reported by the user, or text, pictures or audio or video with pornography, violence or obscenity.

In S307, the server determines the usage scenario of the terminal as a target usage scenario in a case that the decrypted scenario description information is matched with a target scenario feature in the pre-created scenario feature library.

In steps S306 and S307, the server matches the decrypted scenario description information in the pre-created scenario feature library. For example, a target URL included in the scenario description information is compared with an URL in the pre-created scenario feature library, and the usage scenario of the terminal is determined as the electric shopping scenario in a case that the target URL is the same as an official URL provided by the electric business operator. For another example, a target picture in the scenario description information is compared with a picture in the pre-created scenario feature library, and the usage scenario of the terminal is determined as an illegal webpage browsing scenario in a case that the target picture is a pornographic picture, and so forth.

Steps S305 to S307 in the embodiment may be detailed steps of step S102 in the embodiment shown in FIG. 1.

In S308, the server reads a pre-created customized information library. The pre-created customized information library includes at least one usage scenario and customized information corresponding to the usage scenario. The customized information includes notice information and/or security operation prompt information.

The pre-created customized information library may be created at the server side. The pre-created customized information library may be created and updated according to circumstances. The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario.

In S309, the server searches the pre-created customized information library for customized information corresponding to the usage scenario of the terminal.

In S310, the server generates the response message corresponding to the usage scenario of the terminal based on the searched customized information.

The server performs message encapsulation on the searched customized information according to a communication protocol negotiated with the terminal, to generate a response message corresponding to the usage scenario of the terminal. Since the response message corresponds to the usage scenario of the terminal, that is, the response message can provide a notice or a security prompt matching the usage scenario of the terminal, security and intelligence in use of the terminal and user experience are improved by the terminal performing subsequently the scenario response processing based on the response message.

Steps S308 to S310 in the embodiments may be detailed steps of step S103 in the embodiment shown in FIG. 1.

In S311, the server encrypts the response message by the predetermined encryption algorithm.

In S312, the server sends the encrypted response message to the terminal.

The predetermined encryption algorithm may be determined according to circumstances. The predetermined encryption algorithm includes but is not limited to a symmetric encryption algorithm, an asymmetric encryption algorithm, a Hash algorithm and the like. The purpose of the server encrypting the response message by the predetermined encryption algorithm is to ensure reliability of transmission of the response message and improve transmission security.

Steps S311 to S312 in the embodiment are detailed steps of step S104 in the embodiment shown in FIG. 1.

In S313, the terminal decrypts the response message by the predetermined encryption algorithm, to acquire the notice information and/or the security operation prompt information.

In step S313, the terminal decrypts the response message by the same predetermined encryption algorithm which is negotiated with the server. By the encryption process of the server and the decryption process of the terminal for the response message, transmission security and reliability of the response message can be ensured effectively.

In S314, the terminal outputs the notice information and/or executes a security operation based on the security operation prompt information.

The terminal may output the notice information included in the response message. For example, the notice information relating to shopping recommendation such as item price comparing information and item anti-counterfeiting information in the response message may be outputted in a case that the usage scenario of the terminal is the electric shopping scenario. For another example, hot news information may be customized for the case that the usage scenario of the terminal is the legal webpage browsing scenario. The terminal may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, the terminal executes a security operation such as forbidding opening a webpage currently browsed by the user, or outputting a webpage risk prompt. For another example, if the response message includes security operation prompt information such as forbidding a file read operation or forbidding a file write operation in a case that the usage scenario of the terminal is the file read and write scenario, the terminal executes a security operation for forbidding the user to read or write the file. Since the response message corresponds to the usage scenario of the terminal, that is, the response message can provide the notice or the security prompt matching the usage scenario of the terminal, security and intelligence in use of the terminal and user experience are improved by the terminal performing the scenario response processing based on the response message.

Steps S313 and S314 in the embodiment may be detailed steps of step S203 in the embodiment shown in FIG. 2.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by the terminal performing the scenario response processing based on the response message.

An information processing device according to an embodiment of the present disclosure is described in detail below with reference to FIG. 4 to FIG. 7. It should be noted that the information processing device described above may operate in a server. The server may be a background server for an application (for example, a security application in the terminal) having an information processing ability in the terminal, to perform the information processing method shown in FIG. 1 and FIG. 3 described above.

Figure 4:
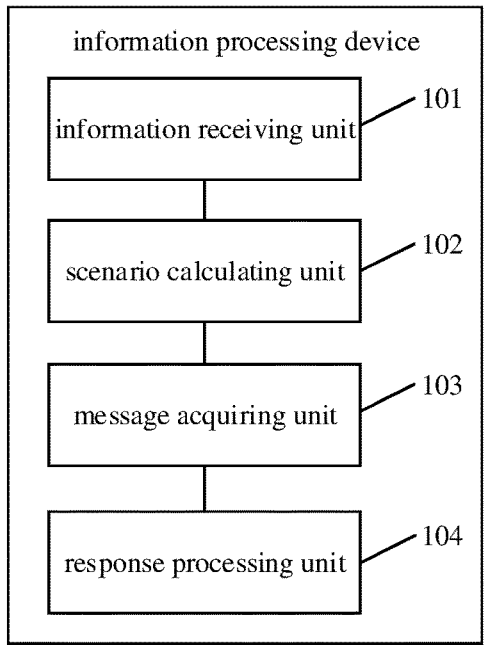
FIG. 4 is a schematic structural diagram of an information processing device according to an embodiment of the present disclosure.

With reference to FIG. 4, which is a schematic structural diagram of an information processing device according to an embodiment of the present disclosure, the information processing device includes an information receiving unit 101, a scenario calculating unit 102, a message acquiring unit 103 and a response processing unit 104.

The information receiving unit 101 is configured to receive scenario description information reported by a terminal. The scenario description information includes webpage information and/or operation instruction information.

The scenario description information may describe a usage scenario of the terminal, the usage scenario of the terminal includes but is not limited to at least one of an electric shopping scenario, a legal webpage browsing scenario, an illegal webpage browsing scenario, a file read and write scenario. The electric shopping scenario may refer to a scenario in which a user browses an electric shopping website by the terminal or a user performs an item purchasing operation in the electric shopping website by the terminal. The legal webpage browsing scenario may refer to a scenario in which the user browses a legally registered webpage by the terminal, for example, the user browses a legally-registered news webpage by the terminal, or the user browses a legally-registered video webpage by the terminal. The illegal webpage browsing scenario may refer to a scenario in which the user browses a webpage that is not legally registered by the terminal, for example, the user browses a pornographic webpage by the terminal, or the user browses a violence obscenity webpage by the terminal. The file read and write scenario may refer to a scenario in which the user performs a read and write operation on a file in the terminal, for example, the user performs an operation of copying or pasting on the file in the terminal. The webpage information includes but is not limited to at least one of webpage address information, webpage text information, webpage picture information, and webpage audio and video information. The webpage address information may be a URL of the webpage, such as an official URL of the electric shopping website. The operation instruction information includes but is not limited to at least one of an account registration operation instruction, a file read and write operation instruction and a payment operation instruction.

A wired or wireless communication connection may be established between the terminal and the server. The terminal may collect the scenario description information of the terminal based on various operation instructions initiated by a user for the terminal, and report the collected scenario description information to the server via the communication connection between the terminal and the server. Similarly, the information receiving unit 101 may receive the scenario description information reported by the terminal via the communication connection between the terminal and the server.

The scenario calculating unit 102 is configured to calculate a usage scenario of the terminal based on the scenario description information.

Since the scenario description information is used for describing the usage scenario of the terminal, the usage scenario of the terminal includes but is not limited to at least one of an electric shopping scenario, a legal webpage browsing scenario, an illegal webpage browsing scenario, and a file read and write scenario. The scenario calculating unit 102 may calculate and determine the usage scenario of the terminal based on the scenario description information.

The message acquiring unit 103 is configured to acquire a response message corresponding to the usage scenario of the terminal. The response message includes notice information and/or security operation prompt information, and the response message is for promoting the terminal to output the notice information and/or execute a security operation based on the security operation prompt information.

The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. In the embodiment of the present disclosure, some information may be customized in advance at the server side for various usage scenarios. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario. The message acquiring unit 103 may acquire customized information corresponding to the usage scenario of the terminal, to generate the response message.

The response processing unit 104 is configured to return the response message to the terminal to perform scenario response processing.

The response processing unit 104 may send the response message corresponding to the usage scenario of the terminal to the terminal via the communication connection between the server and the terminal. The terminal may output the notice information included in the response message. For example, the notice information relating to shopping recommendation such as item price comparing information and item anti-counterfeiting information in the response message may be outputted in a case that the usage scenario of the terminal is the electric shopping scenario. For another example, hot news information may be customized for the case that the usage scenario of the terminal is the legal webpage browsing scenario. The terminal may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, the terminal executes a security operation such as forbidding opening a webpage currently browsed by the user, or outputting a webpage risk prompt. For another example, if the response message includes security operation prompt information such as forbidding a file read operation or forbidding a file write operation in a case that the usage scenario of the terminal is the file read and write scenario, the terminal executes a security operation for forbidding the user to read or write the file. Since the response message corresponds to the usage scenario of the terminal, that is, the response message can provide the notice or the security prompt matching the usage scenario of the terminal, security and intelligence in use of the terminal and user experience are improved by the terminal performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 5:
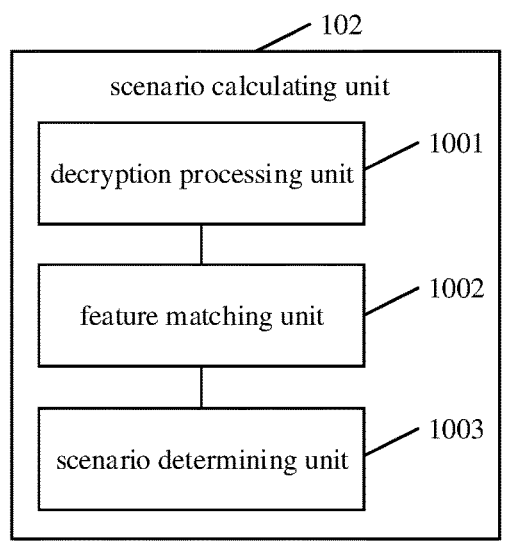
FIG. 5 is a schematic structural diagram of a scenario calculating unit according to the embodiment shown in FIG. 4.

With reference to FIG. 5, which is a schematic structural diagram of the scenario calculating unit according to the embodiment shown in FIG. 4, the scenario calculating unit 102 includes a decryption processing unit 1001, a feature matching unit 1002 and a scenario determining unit 1003.

The decryption processing unit 1001 is configured to decrypt the scenario description information by a predetermined encryption algorithm.

In the embodiment of the present disclosure, the scenario description information are encrypted by the terminal with a predetermined encryption algorithm. The predetermined encryption algorithm may be determined according to circumstances. The predetermined encryption algorithm includes but is not limited to a symmetric encryption algorithm, an asymmetric encryption algorithm, a Hash algorithm and the like. The purpose of the terminal encrypting the scenario description information by the predetermined encryption algorithm is to ensure reliability of transmission of the scenario description information and improve transmission security. The decryption processing unit 1001 decrypts the scenario description information by the same predetermined encryption algorithm which is negotiated with the terminal. By the encryption and decryption of the scenario description information, transmission security and reliability of the scenario description information can be ensured effectively.

The feature matching unit 1002 is configured to match the decrypted scenario description information in a pre-created scenario feature library. The pre-created scenario feature library includes at least one usage scenario and a scenario feature of the usage scenario.

The pre-created scenario feature library may be created at the server side. The pre-created scenario feature library may be created according to experience or statistics. For example, the scenario feature of the electric shopping scenario may include an official URL provided by an electric business operator, and text, pictures and the like describing an item in the electric shopping website. For another example, a scenario feature of the illegal browsing scenario may include a URL that is not registered legally or an illegal URL reported by the user, or text, pictures or audio or video with pornography, violence or obscenity.

The scenario determining unit 1003 is configured to determine the usage scenario of the terminal as a target usage scenario by the server in a case that the decrypted scenario description information is matched with a target scenario feature in the pre-created scenario feature library.

The scenario determining unit 1003 matches the decrypted scenario description information in the pre-created scenario feature library. For example, a target URL included in the scenario description information is compared with an URL in the pre-created scenario feature library, and the usage scenario of the terminal is determined as the electric shopping scenario in a case that the target URL is the same as an official URL provided by the electric business operator. For another example, a target picture in the scenario description information is compared with a picture in the pre-created scenario feature library, and the usage scenario of the terminal is determined as an illegal webpage browsing scenario in a case that the target picture is a pornographic picture, and so forth.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 6:
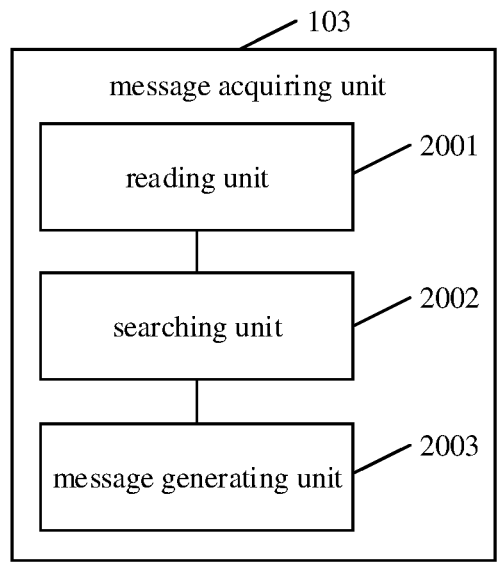
FIG. 6 is a schematic structural diagram of a message acquiring unit according to the embodiment shown in FIG. 4.

With reference to FIG. 6, which is a schematic structural diagram of the message acquiring unit according to the embodiment shown in FIG. 4, the message acquiring unit 103 includes a reading unit 2001, a searching unit 2002 and a message generating unit 2003.

The reading unit 2001 is configured to read a pre-created customized information library. The pre-created customized information library includes at least one usage scenario and customized information corresponding to the usage scenario. The customized information includes notice information and/or security operation prompt information.

The pre-created customized information library may be created at the server side. The pre-created customized information library may be created and updated according to circumstances. The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario.

The searching unit 2002 is configured to search the pre-created customized information library for customized information corresponding to the usage scenario of the terminal.

The message generating unit 2003 is configured to generate the response message corresponding to the usage scenario of the terminal based on the searched customized information.

The message generating unit 2003 performs message encapsulation on the searched customized information according to a communication protocol negotiated with the terminal, to generate a response message corresponding to the usage scenario of the terminal. Since the response message corresponds to the usage scenario of the terminal, that is, the response message can provide a notice or a security prompt matching the usage scenario of the terminal, security and intelligence in use of the terminal and user experience are improved by the terminal performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 7:
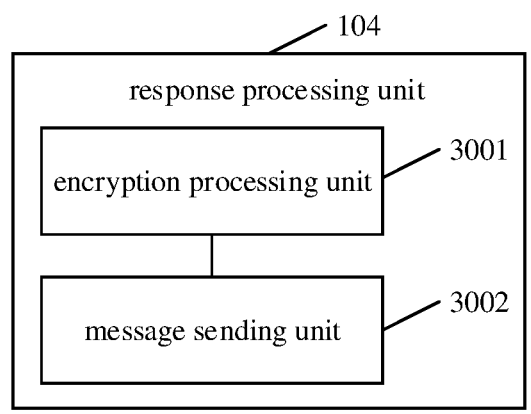
FIG. 7 is a schematic structural diagram of a response processing unit according to the embodiment shown in FIG. 4.

With reference to FIG. 7, which is a schematic structural diagram of the response processing unit according to the embodiment shown in FIG. 4, the response processing unit 104 includes an encryption processing unit 3001 and a message sending unit 3002.

The encryption processing unit 3001 is configured to encrypt the response message by a predetermined encryption algorithm.

The predetermined encryption algorithm may be determined according to circumstances. The predetermined encryption algorithm includes but is not limited to a symmetric encryption algorithm, an asymmetric encryption algorithm, a Hash algorithm and the like. The purpose of the encryption processing unit 3001 encrypting the response message by the predetermined encryption algorithm is to ensure reliability of transmission of the response message and improve transmission security.

The message sending unit 3002 is configured to send the encrypted response message to the terminal, to promote the terminal to output the notice information and/or execute a security operation based on the security operation prompt information.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

A server is further disclosed according to an embodiment of the present disclosure. The server includes an information processing device. For details of the structure and function of the information processing device, reference may be made to related description in the embodiments shown in FIG. 4 to FIG. 7, which is not repeatedly described herein. It should be noted that the server according to the embodiment may be a background server for an application (for example, a security application in the terminal) having an information processing ability in the terminal, to be applied in the methods shown in FIG. 1 to FIG. 3.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Another information processing device according to an embodiment of the present disclosure is described in detail below with reference to FIG. 8 to FIG. 12. It should be noted that the information processing device described below may operate in a terminal, or may be an application having an information processing ability in the terminal, such as a security application in the terminal, to perform the information processing method shown in FIG. 2 and FIG. 3 described above.

Figure 8:
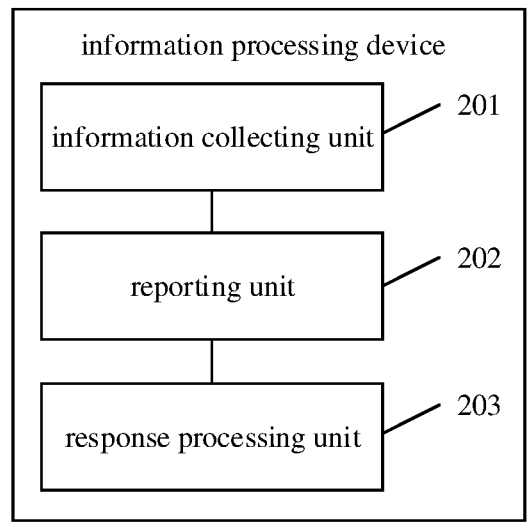
FIG. 8 is a schematic structural diagram of an information processing device according to an embodiment of the present disclosure.

With reference to FIG. 8, which is a schematic structural diagram of another information processing device according to an embodiment of the present disclosure, the information processing device includes an information collecting unit 201, a reporting unit 201 and a response processing unit 203.

The information collecting unit 201 is configured to collect scenario description information on a usage scenario of a terminal. The scenario description information includes webpage information and/or operation instruction information.

The information collecting unit 201 may collect the scenario description information of the terminal based on various operation instructions initiated by a user for the terminal. The scenario description information may be used for describing the usage scenario of the terminal, the usage scenario of the terminal includes but is not limited to at least one of an electric shopping scenario, a legal webpage browsing scenario, an illegal webpage browsing scenario, and a file read and write scenario. The electric shopping scenario may refer to a scenario in which a user browses an electric shopping website by the terminal or a user performs an item purchasing operation in the electric shopping website by the terminal. The legal webpage browsing scenario may refer to a scenario in which the user browses a legally registered webpage by the terminal, for example, the user browses a legally-registered news webpage by the terminal, or the user browses a legally-registered video webpage by the terminal. The illegal webpage browsing scenario may refer to a scenario in which the user browses a webpage that is not legally registered by the terminal, for example, the user browses a pornographic webpage by the terminal, or the user browses a violence obscenity webpage by the terminal. The file read and write scenario may refer to a scenario in which the user performs a read and write operation on a file in the terminal, for example, the user performs an operation of copying or pasting on the file in the terminal. The webpage information includes but is not limited to at least one of webpage address information, webpage text information, webpage picture information, and webpage audio and video information. The webpage address information may be a URL of the webpage, such as an official URL of the electric shopping website. The operation instruction information includes but is not limited to at least one of an account registration operation instruction, a file read and write operation instruction and a payment operation instruction.

The reporting unit 202 is configured to report the scenario description information to the server, where the server calculates the usage scenario of the terminal based on the scenario description information, and acquires and returns a response message corresponding to the usage scenario of the terminal. The response message includes notice information and/or security operation prompt information, the response message is for promoting the terminal to output the notice information and/or execute a security operation based on the security operation prompt information.

A wired or wireless communication connection may be established between the terminal and the server. The terminal may collect the scenario description information of the terminal based on various operation instructions initiated by a user for the terminal. The reporting unit 202 reports the collected scenario description information to the server via the communication connection between the terminal and the server. The notice information includes but is not limited to at least one of shopping recommendation information, hot news information, webpage recommendation information, and software recommendation information. The security operation includes but is not limited to at least one of forbidding opening an illegal webpage, forbidding executing payment without valid permission, forbidding reading and writing a file without valid permission. In the embodiment of the present disclosure, some information may be customized in advance at the server side for various usage scenarios. For example, notice information relating to shopping recommendation such as item price comparing information and item anti-counterfeiting information may be customized for the case that the usage scenario of the terminal is the electric shopping scenario. For another example, hot news information may be customized for the case that the usage scenario of the terminal is the legal webpage browsing scenario. For another example, security operation prompt information such as forbidding the user to browse the webpage or prompting a webpage risk may be customized for the case that the usage scenario of the terminal is the illegal webpage browsing scenario. For another example, security operation prompt information such as forbidding a file read operation or forbidding a file write operation may be customized based on permission given to the user for the case that the usage scenario of the terminal is the file read and write scenario. The server may acquire customized information corresponding to the usage scenario of the terminal to generate the response message, and can return the response message to the terminal via the communication connection between the server and the terminal.

The response processing unit 203 is configured to perform scenario response processing based on the response message returned by the server.

The response processing unit 203 may output the notice information included in the response message. For example, the notice information relating to shopping recommendation such as item price comparing information and item anti-counterfeiting information in the response message may be outputted in a case that the usage scenario of the terminal is the electric shopping scenario. For another example, hot news information may be customized for the case that the usage scenario of the terminal is the legal webpage browsing scenario. The response processing unit 203 may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, a security operation such as forbidding opening a webpage currently browsed by the user or outputting a webpage risk prompt is executed. For another example, if the response message includes security operation prompt information such as forbidding a file read operation or forbidding a file write operation in a case that the usage scenario of the terminal is the file read and write scenario, a security operation for forbidding the user to read or write the file is executed. Since the response message corresponds to the usage scenario of the terminal, that is, the response message can provide the notice or the security prompt matching the usage scenario of the terminal, security and intelligence in use of the terminal and user experience are improved by the response processing unit 203 performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 9:
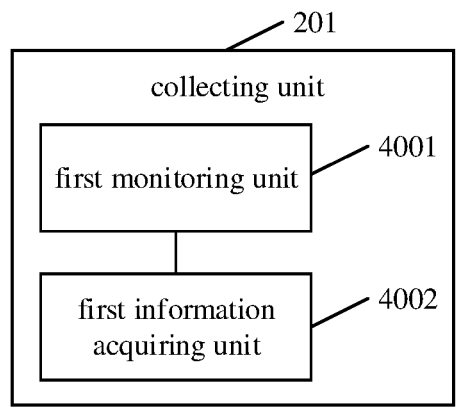
FIG. 9 is a schematic structural diagram of a collecting unit according to the embodiment shown in FIG. 8.

With reference to FIG. 9, which is a schematic structural diagram of the collecting unit according to the embodiment shown in FIG. 8, the collecting unit 201 includes a first monitoring unit 4001 and a first information acquiring unit 4002.

The first monitoring unit 4001 is configured to monitor a plugin interface of a browser of the terminal.

The first information acquiring unit 4002 is configured to, in a case that it is monitored that the browser of the terminal accesses a webpage, acquire information on the accessed webpage.

The usage scenario of the terminal includes but is not limited to at least one of an electric shopping scenario, a legal webpage browsing scenario, an illegal webpage browsing scenario, a file read and write scenario. In the usage scenarios described above, the user usually uses various plugins in the browser of the terminal. The first monitoring unit 4001 monitors a plugin interface of the browser of the terminal, and the first information acquiring unit 4002 may acquire information on the accessed webpage with a HOOK technology in a case that it is monitored that the browser of the terminal performs electric shopping or webpage browsing. The information on the webpage includes but is not limited to at least one of webpage address information, webpage text information, webpage picture information, and webpage audio and video information. The webpage address information may be a URL of the webpage, such as an official URL of an electric shopping website.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 10:
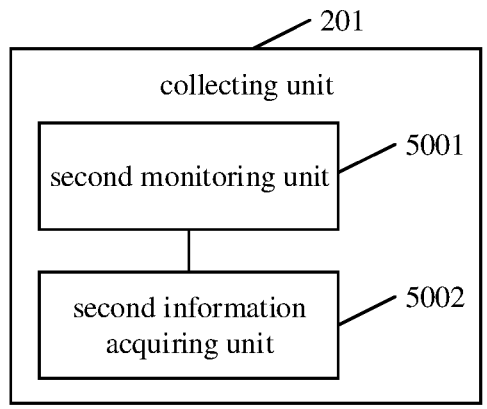
FIG. 10 is a schematic structural diagram of a collecting unit according to the embodiment shown in FIG. 8.

With reference to FIG. 10, which is a schematic structural diagram of another collecting unit according to the embodiment shown in FIG. 8, the collecting unit 201 includes a second monitoring unit 5001 and a second information acquiring unit 5002.

The second monitoring unit 5001 is configured to monitor an API interface of a system of the terminal.

The second information acquiring unit 5002 is configured to, in a case that it is monitored that the system of the terminal responds to an operation instruction, acquire received operation instruction information.

The usage scenario of the terminal includes but is not limited to an account registration scenario, a file read and write scenario, a payment scenario and the like. In the usage scenarios described above, the system of the terminal is usually accessed. The second monitoring unit 5001 monitors an API interface of the system of the terminal, and the second information acquiring unit 5002 acquires operation instruction information sent to the system of the terminal by the user in a case that it is monitored that the system of the terminal responds to an operation instruction. The operation instruction information includes but is not limited to at least one of an account registration operation instruction, a file read and write operation instruction and a payment operation instruction.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 11:
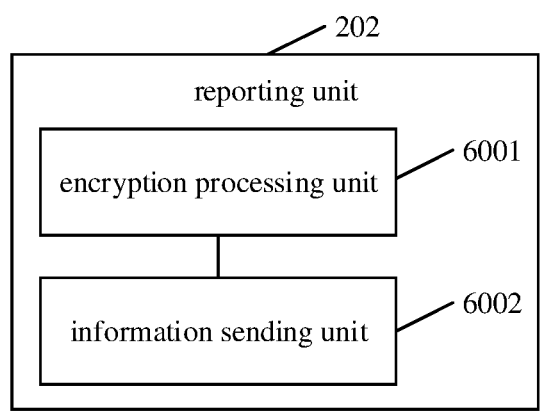
FIG. 11 is a schematic structural diagram of a reporting unit according to the embodiment shown in FIG. 8.

With reference to FIG. 11, which is a schematic structural diagram of a reporting unit according to the embodiment shown in FIG. 8, the reporting unit 202 includes an encryption processing unit 6001 and an information sending unit 6002.

The encryption processing unit 6001 is configured to encrypt the scenario description information by a predetermined encryption algorithm.

The predetermined encryption algorithm may be determined according to circumstances. The predetermined encryption algorithm includes but is not limited to a symmetric encryption algorithm, an asymmetric encryption algorithm, a Hash algorithm and the like. The purpose of the encryption processing unit 6001 encrypting the scenario description information by the predetermined encryption algorithm is to ensure reliability of transmission of the scenario description information and improve transmission security.

The information sending unit 6002 is configured to send the encrypted scenario description information to the server.

A wired or wireless communication connection is established between the terminal and the server, and the information sending unit 6002 may send the encrypted scenario description information to the server via the communication connection between the terminal and the server.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Figure 12:
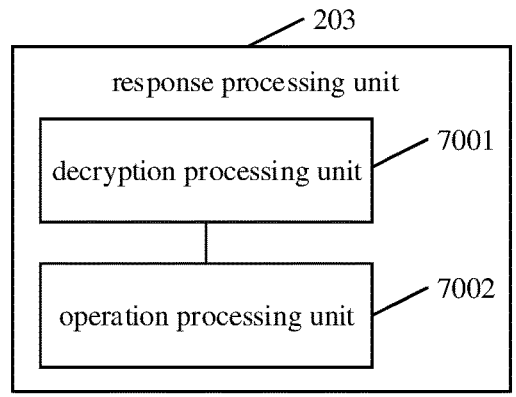
FIG. 12 is a schematic structural diagram of a response processing unit according to the embodiment shown in FIG. 8.

With reference to FIG. 12, which is a schematic structural diagram of a response processing unit according to an embodiment shown in FIG. 8, the response processing unit 203 includes a decryption processing unit 7001 and an operation processing unit 7002.

The decryption processing unit 7001 is configured to decrypt the response message by the predetermined encryption algorithm, to obtain the notice information and/or the security operation prompt information.

The decryption processing unit 7001 decrypts the response message by the same predetermined encryption algorithm which is negotiated with the server. By the encryption and decryption of the response message, transmission security and reliability of the response message can be ensured effectively.

The operation processing unit 7002 is configured to output the notice information and/or execute a security operation based on the security operation prompt information.

The operation processing unit 7002 may output the notice information included in the response message. For example, the notice information relating to shopping recommendation such as item price comparing information and item anti-counterfeiting information in the response message may be outputted in a case that the usage scenario of the terminal is the electric shopping scenario. For another example, hot news information may be customized for the case that the usage scenario of the terminal is the legal webpage browsing scenario. The operation processing unit 7002 may also execute a security operation based on the security operation prompt information included in the response message. For example, if the response message includes security operation prompt information such as forbidding the user to browse the webpage or prompting a webpage risk in a case that the usage scenario of the terminal is the illegal webpage browsing scenario, a security operation such as forbidding opening a webpage currently browsed by the user or outputting a webpage risk prompt is executed. For another example, if the response message includes security operation prompt information such as forbidding a file read operation or forbidding a file write operation in a case that the usage scenario of the terminal is the file read and write scenario, a security operation for forbidding the user to read or write the file is executed. Since the response message corresponds to the usage scenario of the terminal, that is, the response message can provide the notice or the security prompt matching the usage scenario of the terminal, security and intelligence in use of the terminal and user experience are improved by performing the scenario response processing based on the response message.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

A terminal is disclosed according to the embodiments of the present disclosure. The terminal includes an information processing device. For details of the structure and function of the information processing device, reference may be made to related description in the embodiments shown in FIG. 8 to FIG. 12, which are not described repeatedly here. The information processing device may be an application having an information processing ability in the terminal, such as a security application in the terminal. It should be noted that the terminal in the embodiment can be applied in the method shown in FIG. 1 to FIG. 3.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

An information processing device according to an embodiment of the present disclosure is illustrated in detail below with reference to FIG. 13. It should be noted that the device described below may operate in a server, the server may be a background server for an application (for example, a security application in the terminal) having an information processing ability in the terminal, to perform the information processing method shown in FIG. 1 and FIG. 3 described above.

Figure 13:
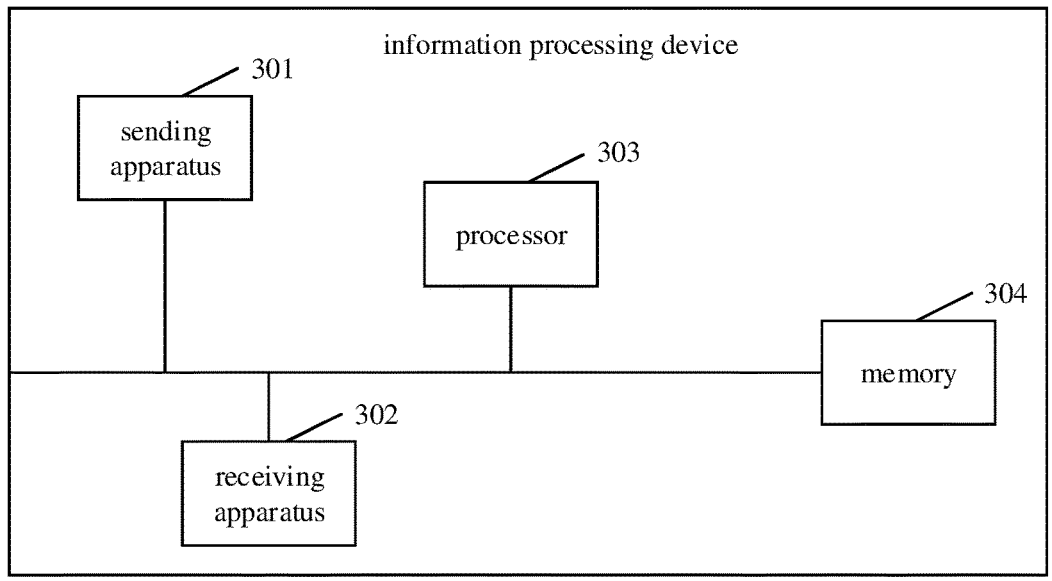
FIG. 13 is a schematic structural diagram of an information processing device according to an embodiment of the present disclosure.

With reference to FIG. 13, which is a schematic structural diagram of an information processing device according to an embodiment of the present disclosure, the information processing device includes a sending apparatus 301, a receiving apparatus 302, at least one processor 303 (for example, CPU), a memory 305 and other components. The components communicate with each other via one or more buses. It can be understood by those skilled in the art that the structure of the information processing device shown in FIG. 13 is not intended to limit the present disclosure, and the information processing device may have a bus topology or a star topology, and may include more or less components than the components in the structure shown in FIG. 13, or may integrate some components or have a different component arrangement.

The processor 303, as a control center of the information processing device, is connected to all parts of the information processing device via interfaces or lines, and performs various functions of the information processing device and/or process data by running or executing program codes and/or modules stored in the memory 304 and calling data stored in the memory 304.

The memory 305 may be a high speed RAM memory, or may also be a non-volatile memory. The memory 304 is used for storing program codes and modules, and the processor 303 executes various function applications of the information processing device and processes data by running the program codes and modules stored in the memory 304. The memory 304 includes a program storage section and a data storage section. The program storage section may store an operating system and program codes required by at least one function, such as program codes for performing service processing. The data storage section may store data created in use of the information processing device.

In the information processing device shown in FIG. 13, the processor 303 may call computer readable program codes stored in the memory 304, to execute operations as follows:

receiving scenario description information reported by the terminal, where the scenario description information includes webpage information and/or operation instruction information;

calculating a usage scenario of the terminal based on the scenario description information;

acquiring a response message corresponding to the usage scenario of the terminal, where the response message includes notice information and/or security operation prompt information, and the response message is for promoting the terminal to output the notice information and/or execute a security operation based on the security operation prompt information; and returning the response message to the terminal to perform scenario response processing.

The webpage information includes at least one of webpage address information, webpage text information, webpage picture information, and webpage audio and video information. The operation instruction information includes at least one of an account registration operation instruction, a file read and write operation instruction and a payment operation instruction. The usage scenario of the terminal includes at least one of an electric shopping scenario, a legal webpage browsing scenario, an illegal webpage browsing scenario, a file read and write scenario. The notice information includes at least one of shopping recommendation information, hot news information, webpage recommendation information, and software recommendation information. The security operation includes at least one of forbidding opening an illegal webpage, forbidding executing payment without valid permission, forbidding reading and writing a file without valid permission.

The scenario description information reported by the terminal is encrypted by a predetermined encryption algorithm. The calculating the usage scenario of the terminal based on the scenario description information includes: decrypting the scenario description information by the predetermined encryption algorithm; matching the decrypted scenario description information in a pre-created scenario feature library, where the pre-created scenario feature library includes at least one usage scenario and a scenario feature of the usage scenario; and determining the usage scenario of the terminal as a target usage scenario in a case that the decrypted scenario description information is matched with a target scenario feature in the pre-created scenario feature library.

Further, the acquiring the response message corresponding to the usage scenario of the terminal includes: reading a pre-created customized information library, where the pre-created customized information library includes at least one usage scenario and customized information corresponding to the usage scenario, the customized information includes notice information and/or security operation prompt information; searching the pre-created customized information library for customized information corresponding to the usage scenario of the terminal; and generating the response message corresponding to the usage scenario of the terminal based on the searched customized information.

Furthermore, the retuning the response message to the terminal to perform the scenario response processing includes: encrypting the response message by a predetermined encryption algorithm; sending the encrypted response message to the terminal, to promote the terminal to output the message information and/or execute a security operation based on the security operation prompt information.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

Another information processing device according to an embodiment of the present disclosure is described in detail below with reference to FIG. 14. It should be noted that the information processing device described below may operate in the terminal, or may be an application having an information processing ability in the terminal, such as a security application in the terminal, to perform the information processing method shown in FIG. 2 and FIG. 3 described above.

Figure 14:
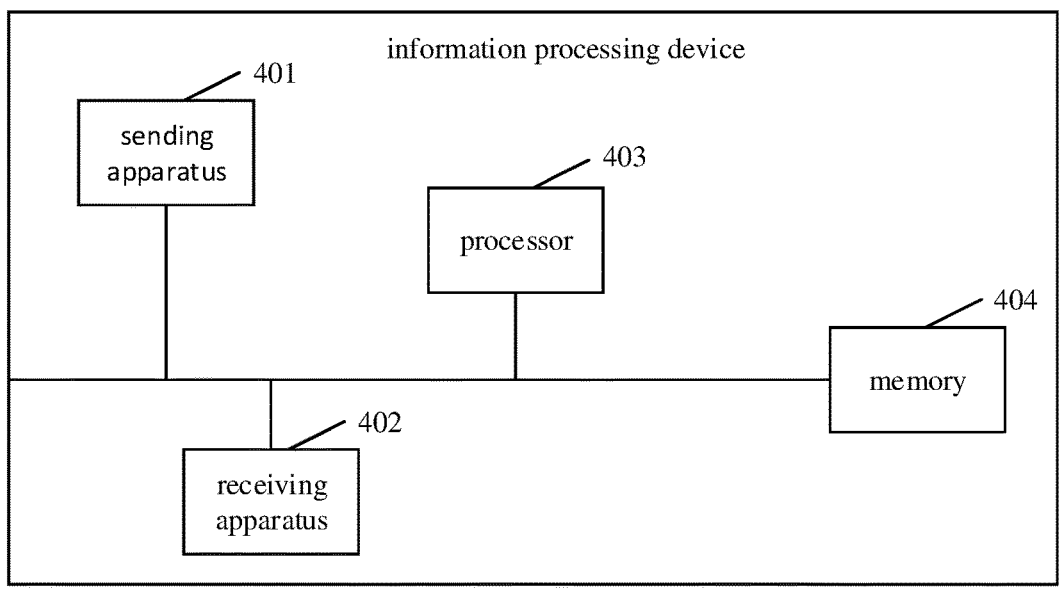
FIG. 14 is a schematic structural diagram of an information processing device according to an embodiment of the present disclosure.

With reference to FIG. 14, which is a schematic structural diagram of another information processing device according to an embodiment of the present disclosure, the information processing device may include a sending apparatus 401, a receiving apparatus 402, at least one processor 403 (for example, CPU), a memory 405 and other components. The components communicate to each other via one or more buses. It can be understood by those skilled in the art that the structure of the information processing device shown in FIG. 14 is not intended to limit the present disclosure, and the information processing device may have a bus topology or a star topology, and may include more or less components than the components in the structure shown in FIG. 14, or may integrate some components or have a different component arrangement.

The processor 403, as a control center of the information processing device, may be connected to all parts of the information processing device via interfaces or lines, and perform various functions of the information processing device and/or process data by running or executing program codes and/or modules stored in the memory 404 and calling data stored in the memory 404.

The memory 405 may be a high speed RAM memory, or may also be a non-volatile memory. The memory 404 can be used for storing program codes and modules, and the processor 403 executes various function applications of the information processing device and processes data by running the program codes and modules stored in the memory 404. The memory 404 includes a program storage section and a data storage section. The program storage section may store an operating system and program codes required by at least one function, such as program codes for performing service processing. The data storage section may store data created in use of the information processing device.

In the information processing device shown in FIG. 14, the processor 403 may call computer readable program codes stored in the memory 404, to execute operations as follows:

collecting scenario description information on a usage scenario of the terminal, where the scenario description information includes webpage information and/or operation instruction information;

reporting the scenario description information to a server, where the server calculates the usage scenario of the terminal based on the scenario description information, and acquires and returns a response message corresponding to the usage scenario of the terminal, the response message includes notice information and/or security operation prompt information, and the response message is for promoting the terminal to output the notice information and/or execute a security operation based on the security operation prompt information; and performing scenario response processing based on the response message returned by the server.

Furthermore, the collecting scenario description information on the usage scenario of the terminal includes: monitoring a plugin interface of a browser of the terminal, and in a case that it is monitored that the browser of the terminal accesses a webpage, acquiring information on the accessed webpage; and/or, monitoring an API interface of a system of the terminal, and in a case that it is monitored that the system of the terminal responds to an operation instruction, acquiring received operation instruction information.

Furthermore, the reporting the scenario description information to the server includes: encrypting the scenario description information by a predetermined encryption algorithm; and sending the encrypted scenario description information to the server. The performing scenario response processing based on the response message returned by the server includes: decrypting the response message by the predetermined encryption algorithm, to acquire the notice information and/or the security operation prompt information; and outputting the notice information and/or executing a security operation based on the security operation prompt information.

In the embodiment of the present disclosure, the usage scenario of the terminal is calculated based on the scenario description information reported by the terminal, and the response message corresponding to the usage scenario of the terminal is pushed to the terminal, to perform scenario response processing. Since the response message corresponds to the usage scenario of the terminal, that is, the response message can provide a notice or a security prompt matching the usage scenario of the terminal, security and intelligence in use of the terminal, the effectiveness of information interaction, and user experience are improved by performing the scenario response processing based on the response message.

It can be understood by those skilled in the art that all or a part of flows for implementing the methods according to the embodiments described above can be implemented by instructing related hardware by a computer program. The described computer program may be stored in a computer readable storage medium. The computer program, when being executed, performs the methods according to the embodiments described above. The storage medium described above may be a magnetic disk, an optical disc, a read-only memory (ROM) or a random access memory (RAM) and the like.

While some embodiments of the present disclosure are described above, this description is not intended to limit the scope of claims of the present disclosure. Therefore, equivalent changes made according to the claims still fall within the scope of the present disclosure.

The invention claimed is:

1. An information pushing method, comprising:
receiving, by a server, scenario description information reported by a terminal, wherein the scenario description information comprises at least one of webpage picture information, webpage video information, or webpage audio information;
screening, by the server, a pre-created scenario feature library for a usage scenario, the pre-created scenario feature library being stored at the server and including a relationship between usage scenarios and the at least one of webpage picture information, webpage audio information, or webpage video information;
identifying from a pre-created customized information library, by the server, customized information corresponding to the usage scenario, the pre-created customized information library being stored at the server and including a relationship between usage scenarios and customized information;
packaging, by the server, the customized information to form a response message according to a communication protocol negotiated between the server and the terminal, wherein the response message comprises at least one of notice information or security operation prompt information, and the response message is for promoting the terminal to perform at least one of outputting the notice information or executing a security operation based on the security operation prompt information; and
returning the response message to the terminal to perform scenario response processing, wherein the usage scenario of the terminal comprises an electric shopping scenario; wherein the notice information comprises shopping recommendation information; wherein the security operation comprises forbidding executing payment without valid permission,
and wherein the method is performed by a processor.

2. The information pushing method according to claim 1, wherein:
the webpage information further comprises at least one of webpage address information or webpage text information;
the usage scenario further comprises a file read and write scenario;
the notice information further comprises at least one of hot news information or software recommendation information;
the security operation further comprises forbidding reading and writing a file without valid permission; and
the scenario description information further comprises operation instruction information including at least one of an account registration operation instruction, a file read and write operation instruction, or a payment operation instruction.

3. The information pushing method according to claim 2, wherein the scenario description information reported by the terminal is encrypted by a predetermined encryption algorithm, the method further comprising:
decrypting the scenario description information by the predetermined encryption algorithm; and
matching the decrypted scenario description information in the pre-created scenario feature library.

4. The information pushing method according to claim 3, wherein returning the response message to the terminal to perform the scenario response processing comprises:
encrypting the response message by the predetermined encryption algorithm; and
sending the encrypted response message to the terminal, to promote the terminal to perform at least one of outputting the message information or executing a security operation based on the security operation prompt information.

5. An information pushing device, comprising: a memory configured to store computer readable program codes; and a processor configured to execute the computer readable program codes to:
receive, by a server, scenario description information reported by a terminal, wherein the scenario description information comprises at least one of webpage picture information, webpage video information, or webpage audio information;
screening, by the server, a pre-created scenario feature library for a usage scenario, the pre-created scenario feature library being stored at the server and including a relationship between usage scenarios and the at least one of webpage picture information, webpage audio information, or webpage video information;
identify from a pre-created customized information library, by the server, customized information corresponding to the usage scenario, the pre-created customized information library being stored at the server and including a relationship between usage scenarios and customized information;
package, by the server, the customized information to form a response message according to a communication protocol negotiated between the server and the terminal, wherein the response message comprises at least one of notice information or security operation prompt information, and the response message is for promoting the terminal to perform at least one of outputting the notice information or executing a security operation based on the security operation prompt information; and
return the response message to the terminal to perform scenario response processing, wherein the usage scenario of the terminal comprises electric shopping scenario; wherein the notice information comprises shopping recommendation information; and wherein the security operation comprises forbidding executing payment without valid permission.

6. The information pushing device according to claim 5, wherein:
the webpage information further comprises at least one of webpage address information or webpage text information;
the usage scenario further comprises a file read and write scenario;
the notice information further comprises at least one of hot news information or software recommendation information;
the security operation further comprises forbidding reading and writing a file without valid permission; and
the scenario description information further comprises operation instruction information including at least one of an account registration operation instruction, a file read and write operation instruction, or a payment operation instruction.

7. The information pushing device according to claim 6, wherein the scenario description information reported by the terminal is encrypted by a predetermined encryption algorithm, and the processor is further configured to:
decrypt the scenario description information by the predetermined encryption algorithm; and
match the decrypted scenario description information in the pre-created scenario feature library.

8. The information processing device according to claim 7, wherein the processor is further configured to:
encrypt the response message by the predetermined encryption algorithm; and
send the encrypted response message to the terminal, to promote the terminal to perform at least one of outputting the message information or executing a security operation based on the security operation prompt information.

9. A non-transitory computer readable storage medium storing computer readable program codes that, when run in an information processing device comprising a processor, cause the processor to perform the method of:
- receiving, by a server, scenario description information reported by a terminal, wherein the scenario description information comprises at least one of webpage picture information, webpage video information, or webpage audio information;
- screening, by the server, a pre-created scenario feature library for a usage scenario, the pre-created scenario feature library being stored at the server and including a relationship between usage scenarios and the at least one of webpage picture information, webpage audio information, or webpage video information;
- identifying from a pre-created customized information library, by the server, customized information corresponding to the usage scenario, the pre-created customized information library being stored at the server and including a relationship between usage scenarios and customized information;
- packaging, by the server, the customized information to form a response message according to a communication protocol negotiated between the server and the terminal, wherein the response message comprises at least one of notice information or security operation prompt information, and the response message is for promoting the terminal to perform at least one of outputting the notice information or executing a security operation based on the security operation prompt information; and
- returning the response message to the terminal to perform scenario response processing, wherein the usage scenario of the terminal comprises an electric shopping scenario; wherein the notice information comprises shopping recommendation information; and wherein the security operation comprises forbidding executing payment without valid permission.

10. The non-transitory computer readable storage medium according to claim 9, wherein:
- the webpage information further comprises at least one of webpage address information or webpage text information;
- the usage scenario further comprises a file read and write scenario;
- the notice information further comprises at least one of hot news information or software recommendation information;
- the security operation further comprises forbidding reading and writing a file without valid permission; and
- the scenario description information further comprises operation instruction information including at least one of an account registration operation instruction, a file read and write operation instruction, or a payment operation instruction.

11. The non-transitory computer readable storage medium according to claim 10, wherein the scenario description information reported by the terminal is encrypted by a predetermined encryption algorithm, and the method further comprises:
- decrypting the scenario description information by the predetermined encryption algorithm; and
- matching the decrypted scenario description information in the pre-created scenario feature library.

12. The non-transitory computer readable storage medium according to claim 11, wherein the method further comprises:
- encrypting the response message by the predetermined encryption algorithm; and
- sending the encrypted response message to the terminal, to promote the terminal to perform at least one of outputting the message information or executing a security operation based on the security operation prompt information.

* * * * *